Oct. 29, 1929. P. LETRILLIART 1,733,810

CASCADE CONNECTED ASYNCHRONOUS ELECTRICAL MACHINE

Filed June 15, 1928

Inventor:-
Pierre Letrilliart,
By:- Smith and Michael,
Attorneys.

Patented Oct. 29, 1929

1,733,810

UNITED STATES PATENT OFFICE

PIERRE LETRILLIART, OF PARIS, FRANCE, ASSIGNOR TO FORGES & ATELIERS DE CONSTRUCTIONS ELECTRIQUES DE JEUMONT, OF PARIS, FRANCE, A FRENCH JOINT-STOCK COMPANY

CASCADE-CONNECTED ASYNCHRONOUS ELECTRICAL MACHINE

Application filed June 15, 1928, Serial No. 285,630, and in France June 23, 1927.

This invention relates to asynchronous electrical machines connected in cascade. Groups constituted by an induction motor with a series commutator motor connected in cascade therewith, are well known for obtaining satisfactory speed-regulation of induction motors as well as an improvement of the power-factor.

The application of a double set of brushes upon the commutator, with regulation of the speed by means of an adjustable inductance connected to the brushes, has been described in the prior patent specificaton No. 1,485,288, dated February 26th, 1924. With groups of this kind, although they present desirable characteristics, the power-factor at no-load running is not improved, whatever be the range of speed considered. The machine always draws from the supply system the same magnetizing power as a simple induction motor. The power-factor rises when the load is increased, but it is difficult to obtain a power-factor $\cos \emptyset = 1$ at loads less than half-load.

The present invention has for its object the construction of groups of this kind having a high power-factor even at about one-tenth of full-load, which fulfills practically all requirements, the power-factor then remaining substantially constant up to full-load.

According to the invention, there is employed an auxiliary winding located in the slots of the stator winding of the commutator machine, the axis of which auxiliary winding is displaced by a fixed angle with relation to that of the main stator winding.

The improved cascade group thus comprises an induction motor and a series of commutator machine, the latter being provided with an auxiliary winding located in the slots of its stator winding and connected to displaceable brushes, in such a way as to form a secondary series machine which operates as a self-excited generator and is superposed upon the main machine with its external circuit closed through a variable inductance, the whole being arranged in such a way as to secure compensation from low loads up to the maximum, with relatively high power-factor at low loads, and to improve the stability of operation in the vicinity of synchronism, especially at low loads, as well as at small lead angles of the brushes.

Figure 1:
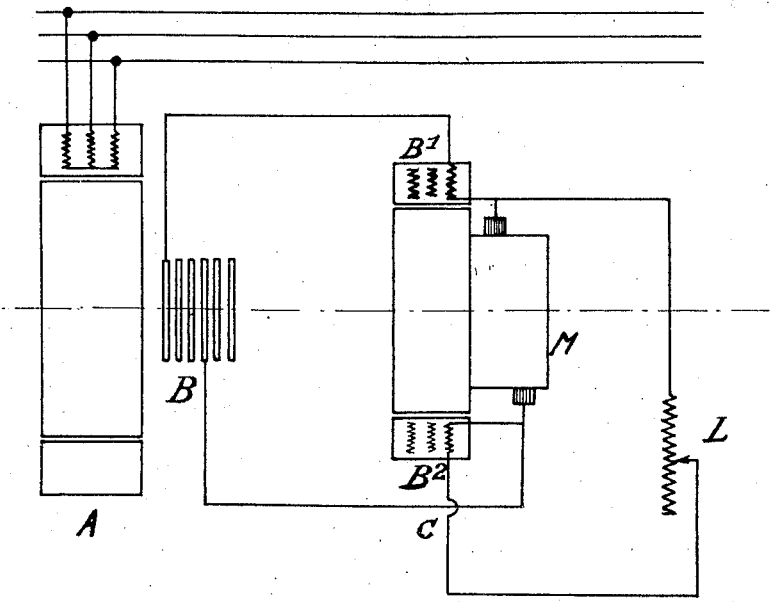
Figure 2:
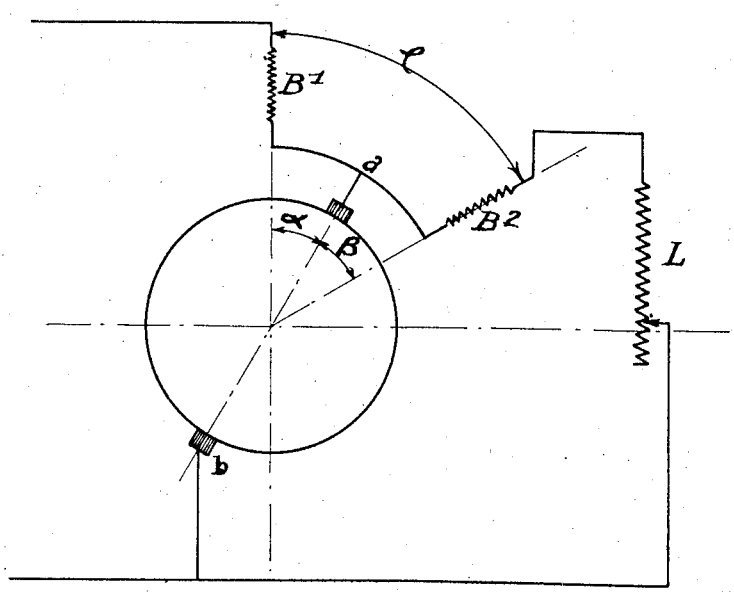

Upon the accompanying drawing, there is represented diagrammatically one form of carrying out the invention. Figure 1 shows the cascade group, comprising an asynchronous motor A, of which the slip-rings B are connected to the commutator motor C. Figure 2 illustrates the angular relation of the two stator windings B, $B^2$ and the two sets of brushes $a\ b$ of the commutator motor.

The main stator winding $B_1$ is connected in series with the brushes $a$ of the commutator M. The variable choke or inductance L is connected as a shunt between the two sets of brushes $a\ b$. The auxiliary stator winding $B_2$ is interposed in this inductance circuit.

Referring to Figure 2, if the circuit $aB_2Lb$ is considered, it is found to contain the elements of a series machine of which the stator is formed by the winding $B_2$ and the rotor by the main rotor of the commutator machine.

This series machine circuit is closed through the speed adjusting variable inductance L. The brushes of this series machine are displaced in the forward direction by the angle $\beta = l - \alpha$, whereas for the main commutator machine upon which it is superposed, the forward displacement of the brushes is $\alpha$.

The combination of the series commutator machine with the secondary series machine thus produced allows of attaining the object sought according to the invention.

The secondary series machine, with forward or generator displacement of the brushes, is capable of self-excitation in well known conditions, subject to suitable relation between the circuit constants, exactly like a series commutator machine closed upon resistances for regenerative braking in the manner of a self-exciting generator, as in the prior specification No. 1,485,288 already mentioned.

The machine thus excited introduces no disturbing torque by reason of the relatively small dimensions of the winding $B_2$.

The circuit of the compensating winding $B_2$, the self-inductance L and the rotor of the commutator machine can be considered as an ordinary series motor circuit, the compensating winding $B_2$ acting as the stator and the rearward or generator lead of the brushes being equal to $\beta$. The dynamic resistance of the motor is negative and equal to $I_r \, g\omega m \sin \beta \, . \, (1-gc)$, where $I_r$ is the current in the circuit considered. $m$ is the coefficient of mutual induction between the winding $B_2$ and the rotor.

$$m = \frac{B_2}{B_1} M$$

$M$ being the coefficient of mutual induction between the winding $B_1$ and the rotor, and $\frac{B_2}{B_1}$ is the ratio of the number of turns of these windings.

$g$ is the slip of the asynchronous motor A and $gc$ the slip of the commutator machine.

Compensation takes place when the negative dynamic resistance is equal to the ohmic resistance R of the circuit.

$$I_r \omega M \frac{B_2}{B_1} \sin \beta \, . \, \frac{pc}{pa} \frac{N}{N_s} = RI_r$$

N being the speed of rotation of the group. $N_s$ being the speed of synchronism of the asynchronous motor.

$$\frac{B_2}{B_1} = \frac{R}{\omega M \frac{pc}{pa}} \frac{L}{\sin \beta} \, . \, \frac{N_s}{N}$$

$pa$ the number of pairs of poles of the asynchronous motor. $pc$ the number of pairs of poles of the commutator motor.

This secondary series machine produces a double result:—

(1) It supplies a magnetizing force which ensures compensation from a very low value of the load, the explanations given in the preceding paragraph being sufficient to allow one skilled in the art to calculate the winding $B_2$ accordingly.

(2) It plays the part of negative resistance in order to compensate in part of the ohmic resistance of the circuit $aB_2Lb$.

This latter compensation is particularly desirable:

(a) In the immediate vicinity of synchronism, where the effects of resistance become preponderant over the effects of induction and interfere with the satisfactory operation; it may happen indeed that the speed at no-load is no longer that corresponding to the adjustment of the shunt inductance, and that the group runs up to synchronism instead of remaining at the desired value.

(b) At any speed in the case of small angles of lead or displacement of the brushes, where the stability of working is uncertain.

In both cases the negative-resistance compensation prevents the undesired irregularity.

What I claim is:—

1. An asynchronous electrical machine, comprising an induction motor, an alternating current commutator motor, said motors having their rotors coupled mechanically and being connected electrically in cascade, said commutator motor having two sets of brushes thereon, one of said sets being fixed in angular position, the other of said sets being movable angularly, an auxiliary stator winding upon said commutator motor, said auxiliary stator winding being displaced angularly in relation to the main stator winding of said commutator motor, and a speed-regulating inductance, said auxiliary stator winding being connected in series with said inductance between corresponding brushes of the two sets.

2. An asynchronous electrical machine, comprising an induction motor, a series commutator motor, said motors having their rotors coupled mechanically, and the rotor of said induction motor being cascaded electrically with said commutator motor, an auxiliary stator winding upon said commutator motor, said auxiliary stator winding being located in the same slots as the main stator winding but the axes of said stator windings being displaced relatively to one another through a fixed angle, and a variable inductance connected in series with said auxiliary stator winding to form a shunt across the brushes of said commutator motor.

3. In an asynchronous electrical machine, comprising an induction motor, a series commutator motor, said motors having their rotors coupled mechanically and being connected electrically in cascade, and a speed regulating variable inductance, an auxiliary stator winding located in the stator slots of said commutator motor, said auxiliary stator winding being connected across the brushes of said commutator motor to form a secondary series machine superposed on said commutator motor and having its external circuit closed through said variable inductance.

4. An asynchronous electrical machine, comprising an induction motor, a series alternating current commutator motor, said motors having their rotors coupled mechanically and being cascaded electrically, said commutator motor having two sets of brushes, one of said sets being fixed in angular position, the other of said sets being movable angularly, an auxiliary stator winding upon said commutator motor, and a variable inductance connected in series with said auxiliary stator winding across the two sets of brushes of said commutator motor, said auxiliary stator winding being adapted for self-excitation and serving to raise the power-factor at low loads.

5. An asynchronous polyphase electrical machine, comprising a polyphase induction motor, a series commutator motor, said motors having their rotors coupled mechanically and being cascaded electrically, an auxiliary polyphase winding upon the stator of said commutator motor, and a polyphase inductance, said auxiliary polyphase stator winding being connected across the brushes of said commutator motor and being closed upon said polyphase inductance.

In testimony whereof I hereunto affix my signature.

PIERRE LETRILLIART.